United States Patent Office 3,216,930
Patented Nov. 9, 1965

3,216,930
PROCESS FOR LIQUID RECOVERY AND
SOLUTION CONCENTRATION
David N. Glew, Sarnia, Ontario, Canada, assignor to The
Dow Chemical Company, Midland, Mich., a corporation of Delaware
No Drawing. Filed Jan. 4, 1963, Ser. No. 249,307
10 Claims. (Cl. 210—22)

This invention relates to a novel process for liquid recovery and solution concentration and more particularly is concerned with an osmotic extraction method involving no high internal pressure differentials for removing water from aqueous solutions.

The known art for recovering water from its aqueous solutions, particularly electrolyte solutions and other solutions whose solutes are non-electrolytes that are less volatile than water by osmotic action involves the use of a large pressure differential, e.g. about 1000 pounds per square inch, between the two aqueous phases on the opposite sides of a water permeable membrane. These processes therefore require membranes of considerable thickness to assure a strength sufficient to withstand these pressures without rupturing and breaking. With thick-walled membranes, low flow rates of water result and the high pressures involved require complex, heavy duty pressurizing pumps that are costly and expensive to operate.

Now, unexpectedly it has been found that high liquid flow rates through a semi-permeable membrane at low differential pressures with resultant solution concentration and/or liquid recovery readily can be achieved by the process of the instant invention.

It is a principal object of the present invention to provide a novel low differential pressure process for concentrating solutions and/or recovering a liquid component by osmotic flow of the liquid through a semi-permeable membrane.

It is another object of the present invention to provide a novel low differential pressure process for recovering portable water in good flow rates from aqueous solutions by osmotic flow of water through a thin-walled semi-permeable membrane.

It is an additional object of the present invention to provide a novel method for recovering potable water from sea water and other aqueous solutions wherein the water is markedly more easily and economically separated and recovered from a resulting two-phase liquid extraction system than directly from the aqueous solution itself.

These and other objects and advantages of the present novel process readily will become apparent from the detailed disclosure of the invention presented hereinafter.

In accordance with the present process a liquid component ($C_1$), i.e. solvent member of a homogeneous solution, is osmotically extracted from its homogeneous solution ($P_1$) through a semi-permeable membrane by a liquid two-phase system ($P_2+P_3$) in which the liquid component ($C_1$) has a lower activity than in the said homogeneous solution ($P_1$). One phase ($P_2$) of the liquid two-phase system ($P_2+P_3$) consists of the liquid component ($C_1$) dissolved in a liquid extracting agent ($C_2$) while the other phase ($P_3$) of this two-phase system consists of the liquid extracting agent ($C_2$) dissolved in the liquid component ($C_1$). Phase ($P_3$), containing the extracted liquid component ($C_1$), is separated from the two-phase system ($P_2+P_3$) and the extraction agent ($C_2$) contained therein as a minor component readily is separated from the liquid component ($C_1$).

The term "activity" as used herein is that property for a real solution that in the free energy equation replaces the mole fraction term for an ideal solution as is well understood by one skilled in the art. (See Glasstone, Elements of Physical Chemistry, D. Van Nostrand Company, Inc., 17th printing, p. 282–285 and p. 483–495 for a discussion of "activity" and "activity coefficient.")

The present process is particularly suitable for recovering potable water from aqueous electrolyte and non-electrolyte solutions, such as sea water, alcoholic beverages, aqueous fermentation products and fruit juices for example, and for concentrating such solutions.

In using the present process to recover potable water from sea water, brackish water, or other aqueous electrolyte or non-electrolyte solutions, for example, a membrane is provided that is permeable to water but is substantially impermeable to ionic and molecular species present in the solution and the extraction agent.

In carrying out the instant process, a two-phase aqueous liquid extractant system ($P_2+P_3$) in which there is partial miscibility of water ($C_1$) and in which water has a lower activity than in the electrolyte or non-electrolyte solution ($P_1$) to be extracted is positioned on one side of the membrane and the solution ($P_1$) is moved along the other side of the membrane.

As the electrolyte or non-electrolyte solution ($P_1$) moves past the membrane, the two-phase liquid system ($P_2+P_3$) osmotically extracts liquid ($C_1$) therefrom through this barrier.

With the flow of water into the two-phase system, phase ($P_3$) having the extraction agent ($C_2$) dissolved in water does not become more dilute but increases in bulk at constant composition because of the continuous transfer of extraction agent from the extracting agent rich phase ($P_2$). The water-rich phase ($P_3$) is separated from the other phase ($P_2$) of the two-phase aqueous extraction system ($P_2+P_3$), ordinarily on a continuous or periodic basis, and the extraction agent ($C_2$) stripped therefrom. The resulting substantially solute and extraction agent ($C_2$) free water ($C_1$) is recovered. The stripped extraction agent ($C_2$) is not lost but ordinarily is returned to the system ($P_2+P_3$) for reuse.

The dilute extraction agent (solute) ($C_2$) in the separated aqueous phase ($P_3$) readily is removed therefrom by flash distillation, conventional distillation, stripping techniques or other ordinary separatory processes employed on simple mixtures.

Although this illustrative example indicates the continuous movement of fresh sea water, for example, along a membrane for purposes of recovering potable water therefrom, an electrolyte or non-electrolyte solution can be maintained in a closed system and recirculated along the membrane barrier in multiple passes thereby to provide for both water recovery and concentration of the solution.

This process ordinarily is carried out at ambient temperatures. Room temperatures, from about 20 to about 25° C., are satisfactory. The minimum practical low operation temperature is the freezing point of the liquid component ($C_1$) or extracting agent ($C_2$) employed in the two-phase liquid system. The maximum temperature of operation is the critical solution temperature of the two-phase ($P_2+P_3$) extractant system.

Pressures to be employed are those at which the extracting agent ($C_2$) is maintained in the liquid state at the temperature of operation. The process operates satisfactorily if there is no pressure differential between the systems on the opposite sides of the membrane. However, by maintaining a slight pressure differential across the membrane, i.e. having a slight pressure drop from the homogeneous solution ($P_1$) to the two-phase extraction medium ($P_2+P_3$) flow of liquid component ($C_1$) through the membrane is further stimulated. The actual pressure differential to be maintained in the system need not be great. Pressure differentials of from about 1 to about 250 pounds per square inch have been found to be satisfactory. These relatively low pressure differences permit the use of a thin membrane having a low mechanical strength in direct opposition to that required by conventional high pressure differential osmotic processes.

Membranes suitable for use in the present process are those materials permeable substantially only to liquid component ($C_1$). Generally, for water recovery from sea water an ordinary glass semi-permeable membrane permeable to $H_2O$, but which rejects chloride, sodium, calcium, bromide, magnesium and the other ionic and molecular species found in this electrolyte as well as rejects the extracting agent ($C_2$) is employed. The terms ordinary glass or glass as used herein refer to common glass, window glass or soda lime glass. Soda lime glass, for example, is prepared from melted silica that has been fluxed with lime (expressed as CaO) and soda (expressed as $Na_2O$) and small quantities of other oxides. Upon cooling, the liquid mass becomes rigid without crystallizing.

Preferably the membrane has a permeability so as to provide ready flow of water, which has during transport therethrough a molar volume of about 25 cubic centimeters per gram mole, this molar volume hereinafter being referred to as the transport molar volume. The thickness of the membrane to be used is not critical except that it must have a sufficient mechanical strength so as to be operable in a given system. Since water flow rate through the membrane decreases with increasing thickness, generally it is preferred to keep this dimension to a practical minimum. For systems where a slight pressure differential is maintained between the two liquid systems on the opposite sides of the membrane, membranes of a thickness ranging from about 10 microns to about 300 microns are preferred. Where no impressed pressure differential exists in the system, membranes of from about 10 to about 50 microns can be used.

In addition to glass, copper ferrocyanide supported on a porous clay base also serves as a very satisfactory membrane. This latter membrane is prepared by treating a fine grade fired clay with magnesium silicate to fill any large voids in the clay. This porous clay article is used as a support for the copper ferrocyanide membrane. The membrane itself is formed within the clay structure by diffusion of $CuSO_4$, from an aqueous solution, from one side and $K_4Fe(CN)_6$, from an aqueous solution, from the other side of the fired clay support. Alternatively, the membrane can be produced in the fine fired clay by electrolysis using a copper electrode in an aqueous cupric ion containing solution and a platinum electrode in a $Fe(CN)_4^{4-}$ ion containing aqueous solution.

The liquid extracting agent ($C_2$) to be employed can be selected from any of a wide variety of materials in which the liquid component ($C_1$) is partially miscible and which provides a two-phase system with the liquid component ($C_1$) wherein this liquid component ($C_1$) has a lower activity than in the homogeneous solution ($P_1$) from which this component ($C_1$) is to be extracted.

For water recovery, two-phase aqueous liquid systems ($P_2+P_3$) are employed in which there is partial miscibility, e.g. a solubility of from about 2 to about 100 grams of extracting agent ($C_2$) per 100 grams of water and from about 1 to about 100 grams water solubility per 100 grams of the extraction agent ($C_2$) and wherein water has a lower activity than in the aqueous solution ($P_1$) to be concentrated. Preferably the solubility of extracting agent ($C_2$) in water or water in extracting agent ($C_2$) ranges from about 5 to about 100 grams per 100 grams of the second member.

Illustrative extractive agents ($C_2$) suitable for use in the two-phase aqueous liquid system ($P_2+P_3$) employed in removing water from electrolyte solutions ($P_1$) include, for example, sulfur dioxide, aliphatic alcohols having from about 4 to about 6 carbon atoms, alicyclic alcohols having from about 4 to about 6 carbon atoms, aliphatic aldehydes having from about 3 to about 6 carbon atoms, aliphatic ketones having from about 4 to about 6 carbon atoms, aliphatic amines having from about 4 to about 6 carbon atoms, aliphatic ethers having from about 3 to about 6 carbon atoms, alicyclic ethers having from about 5 to about 6 carbon atoms and the like.

The following examples will serve further to illustrate the present invnetion but are not meant to limit it thereto.

Example 1

Sea water ($P_1$), from which dissolved oxygen has been removed, is continuously pumped at a predetermined flow rate at a pressure of about 50 pounds per square inch absolute on one side of a glass semipermeable membrane, permeable to water. On the other side of the membrane is placed a two-phase liquid system ($P_2+P_3$) comprised of a first phase solution ($P_2$) of water dissolved in liquid sulfur dioxide extracting agent ($C_2$) and a second phase solution ($P_3$) of sulfur dioxide dissolved in water maintained at ambient temperature of about 20° C. by heat exchange through the membrane. Under such reaction conditions, the sulfur dioxide-water system ($P_2+P_3$) exerts a total pressure of about 45 pounds per square inch absolute and water is continuously extracted from the sea water ($P_1$) through the membrane thereby to continuously increase the volume of the aqueous solution ($P_3$) containing sulfur dioxide solute dissolved therein.

The aqueous sulfur dioxide containing solution ($P_3$) is continuously removed from the osmotic cell reactor and subjected to flash distillation to remove the dissolved sulfur dioxide ($C_2$) therefrom and yield potable water.

The sulfur dioxide extracting agent ($C_2$) is recompressed and returned to the osmotic cell as liquid sulfur dioxide for subsequent reuse in the extraction process.

Example 2

Solids-free brackish water ($P_1$) is pumped continuously at a fixed rate on one side of a semi-permeable membrane, permeable to water. On the other side of the membrane, a two-phase liquid system of methylethyl ketone-water ($P_2+P_3$), comprising liquid methylethyl ketone extracting agent ($C_2$) containing dissolved water ($P_2$) and liquid water containing methylethyl ketone ($P_3$), is maintained at ordinary temperatures, e.g. about 15–30° C. at atmospheric pressure. As the dilute electrolyte solution ($P_1$) passes the membrane, the two-phase organic-water system ($P_2+P_3$) extracts water therefrom and in so doing increases the volume of the aqueous methylethyl ketone phase ($P_3$) while reducing the volume of the organic rich phase ($P_2$). The dilute aqueous methylethyl ketone solution ($P_3$) is continuously withdrawn from the reactor as formed and distilled to give a minimum constant boiling methylethyl ketone-water azeotrope as overheads and substantially pure water bottoms. The overhead azeotrope can be condensed and recycled to replenish the methylethyl ketone organic rich phase ($P_2$) in the osmotic cell reactor.

By single effect fractionation about 8 moles of potable water are recovered per mole azeotrope distilled overhead. Use of multistage fractionation increases the recovery to from about 8 to 32 moles of potable water per mole azeotrope distilled, the efficiency of recovery depending upon the number of stages.

Example 3

In a manner similar to that described for Example 2, a dilute 3 percent by weight solution of ethyl alcohol ($P_1$) is passed in closed circuit along a semi-permeable membrane permeable to water and the water extracted into a secondary butyl alcohol-water two-phase system ($P_2+P_3$). The entire system is maintained at about 20–25° C. and atmospheric pressure.

The aqueous ethyl alcohol is recirculated in multiple passes along the membrane whereby water is continuously extracted therefrom, the ethyl alcohol solution becoming increasingly concentrated. This action is continued until the ethyl alcohol solution concentration attains about 10 percent by weight.

The aqueous phase ($P_3$) containing dissolved secondary butyl alcohol ($C_2$) can be separated into its components thereby generating potable water and recovering the secondary butyl-water azeotrope which can be recycled to the extracting system for reuse.

*Example 4*

A 5 percent by weight aqueous vinegar solution ($P_1$) is carried along at about 20° C. on one side of a semi-permeable membrane which is permeable to water. On the other side of the membrane at the same temperature there is an aqueous two-phase extraction system ($P_2+P_3$) consisting of the phases ($P_2$) water in liquid propionaldehyde and ($P_3$) propionaldehyde in liquid water. This two-phase system ($P_2+P_3$) extracts water from the aqueous vinegar ($P_1$) through the membrane. The aqueous vinegar ($P_1$) is circulated in closed circuit until it attains a concentration of about 12 percent by weight, the extractant phase ($P_3$) consisting of propionaldehyde in liquid water increasing in volume as the extraction proceeds at the expense of the propionaldehyde based phase ($P_2$). This aqueous extractant phase ($P_3$) is separated from the propionaldehyde based phase ($P_2$). The water and propionaldehyde ($C_2$) present in the aqueous based propionaldehyde phase ($P_3$) in turn are separated by conventional separation methods, the propionaldehyde being recirculated back to the reactor for additional extraction.

In a manner similar to that described for the foregoing examples any of the hereinbefore listed and other extracting agents ($C_2$) suitable for use in the present process can be employed in accordance with the present invention to achieve recovery of potable water and electrolyte solution ($P_1$) concentration.

Various modifications can be made in the present invention without departing from the spirit or scope thereof for it is understood that I limit myself only as defined in the appended claims.

I claim:

1. An osmotic pressure process for concentrating an aqueous solution ($P_1$) and recovering water which comprises:
    (1) providing a thin semi-permeable membrane, said membrane being permeable to water but being substantially impermeable to ionic and molecular species other than water present in an aqueous solution ($P_1$),
    (2) maintaining on one side of said membrane an aqueous two-phase liquid extractant system ($P_2+P_3$) in which there is partial miscibility of water and wherein water has a lower activity than in a first aqueous solution ($P_1$), said aqueous-two phase liquid extractant system ($P_2+P_3$) comprising a water rich second aqueous system phase ($P_3$) consisting of an extracting agent ($C_2$) dissolved in said water and an extractant rich phase ($P_2$) consisting of said water dissolved in said extracting agent ($C_2$),
    (3) passing said aqueous solution ($P_1$) in contact with said semi-permeable membrane on the side opposite that contacted by said two-phase system ($P_2+P_3$) while maintaining the pressure on both sides of said system substantially the same,
    (4) extracting water from said first aqueous solution ($P_1$) by said liquid extractant two-phase system ($P_2+P_3$) through said semi-permeable membrane thereby to continuously build up the water rich second aqueous system phase ($P_3$) of said extractive agent dissolved in said water,
    (5) removing said phase ($P_3$) of the aqueous solution of said extracting agent from the two-phase liquid system ($P_2+P_3$), and
    (6) separating said water and said extracting agent ($C_2$) thereby to recover said water and said extracting agent ($C_2$).

2. The process as defined in claim 1 and including the step of recycling the recovered extracting agent ($C_2$) for subsequent water recovery.

3. The process as defined in claim 1 wherein the first aqueous solution ($P_1$) is in a closed circuit and is transported in multiple passes along the membrane thereby to provide for continuous extraction of water therefrom and increased concentration of said aqueous solution ($P_1$).

4. The process as defined in claim 1 wherein the semi-permeable membrane has a maximum permeability such that constituents having a transport molar volume of greater than about 25 cubic centimeters per gram mole are rejected thereby.

5. The process as defined in claim 1 wherein the pressure differential across the semi-permeable membrane is from about 1 to about 250 pounds per square inch, said first aqueous solution ($P_1$) being at a higher pressure than said two-phase aqueous liquid extractant system ($P_2+P_3$).

6. A process for recovering potable water from sea water ($P_1$) which comprises:
    (1) providing a thin semi-permeable membrane, said membrane having a permeability such that ionic and molecular species having a transport molar volume of greater than about 25 cubic centimeters per gram mole are rejected thereby,
    (2) maintaining a two-phase aqueous liquid system ($P_2+P_3$) of water and an extracting agent ($C_2$) on one side of said membrane wherein water has a lower activity than in said sea water ($P_1$), one of said phases ($P_3$) of said two-phase aqueous liquid system ($P_2+P_3$) providing a layer in which the extracting agent has a solubility of from about 5 to about 100 grams per 100 grams of water and the other of said phases ($P_2$) providing a layer in which water has a solubility of from about 5 to about 100 grams per 100 grams of said extracting agent ($C_2$),
    (3) passing said sea water ($P_1$) along said semi-permeable membrane on the side of said membrane opposite that contacted by said aqueous two-phase system ($P_2+P_3$) while maintaining the pressure on both sides of said system substantially the same,
    (4) extracting water from said sea water ($P_1$) through said membrane by said liquid two-phase system ($P_2+P_3$) thereby to continuously build up the water phase ($P_3$) containing said dissolved extracting agent ($C_2$) of said two-phase system ($P_2+P_3$),
    (5) removing the said water phase ($P_3$) containing the extracting agent ($C_2$) from the two-phase system ($P_2+P_3$) and separating the water and said extracting agent ($C_2$) thereby to recover said water and said extracting agent ($C_2$).

7. A process for recovering potable water from sea water ($P_1$) which comprises:
    (1) providing a thin semi-permeable membrane, said membrane having a permeability such that ionic and molecular species having a transport molar volume of greater than about 25 cubic centimeters per gram mole are rejected thereby,
    (2) maintaining a two-phase aqueous liquid system ($P_2+P_3$) of water and sulfur dioxide liquid extracting agent ($C_2$) at a temperature of about 20° C. and a pressure of about 45 pounds per square inch absolute on one side of said membrane,
    (3) passing sea water ($P_1$) at a pressure of about 50 pounds per square inch absolute along said semi-permeable membrane on the side of said membrane opposite that contacted by said two-phase liquid system ($P_2+P_3$) of water and sulfur dioxide,
    (4) extracting water from said sea water ($P_1$) through said membrane by said liquid two-phase system ($P_2+P_3$) thereby to build up the volume of the aqueous solution ($P_3$) containing sulfur dioxide solute dissolved therein,
    (5) separating said aqueous solution ($P_3$) from the liquid sulfur dioxide phase ($P_2$) having water dissolved therein, and, (6) removing the sulfur dioxide ($C_2$) from said separated aqueous solution ($P_3$) thereby to recover potable water and regenerate the sulfur dioxide extracting agent ($C_2$).

8. The process as defined in claim 7 and including the step of recompressing the regenerated sulfur dioxide extracting agent ($C_2$) to liquefy this material and recycling said liquefied sulfur dioxide ($C_2$) for subsequent water extraction from said sea water ($P_1$).

9. A process for recovering potable water from brackish water ($P_1$) which comprises:
   (1) providing a thin semi-permeable membrane, said membrane having a permeability such that ionic and molecular species having a transport molar volume of greater than about 25 cubic centimeters per gram mole are rejected thereby,
   (2) maintaining one one side of said membrane a two-phase aqueous liquid system ($P_2+P_3$) of water and methylethyl ketone liquid extracting agent ($C_2$) at from about 15 to about 30° C. and atmospheric pressure,
   (3) passing brackish water ($P_1$) at about atmospheric pressure along said membrane on the side opposite that contacted by said two-phase liquid system ($P_2+P_3$) of water and methylethyl ketone,
   (4) extracting water from said brackish water ($P_1$) through said membrane by said liquid two-phase system ($P_2+P_3$) thereby to build up the volume of the aqueous solution ($P_3$) containing methylethyl ketone solute dissolved therein,
   (5) separating said aqueous solution ($P_3$) from the liquid methylethyl ketone phase ($P_2$) having water dissolved therein, and,
   (6) removing the methylethyl ketone ($C_2$) as a constant boiling methylethyl ketone-water azeotrope from said aqueous solution ($P_3$) thereby to provide potable water.

10. The process as defined in claim 9 wherein and including the step of recycling the methylethyl ketone-water azeotrope for subsequent water extraction from said brackish water.

References Cited by the Examiner

UNITED STATES PATENTS

| | | | |
|---|---|---|---|
| 2,972,349 | 2/61 | De Wall | 128—214 |
| 3,097,076 | 7/63 | Reid | 210—22 |

OTHER REFERENCES

Weissberger: "Technique of Organic Chemistry," vol. III, 2nd edition, Part I, "Separation and Purification," copyright 1956 by Interscience Publishers, Inc., New York, pages 75–79 relied upon.

MORRIS O. WOLK, *Primary Examiner.*